(12) United States Patent
Kamiya

(10) Patent No.: US 7,042,904 B2
(45) Date of Patent: May 9, 2006

(54) METHOD AND APPARATUS FOR TRANSMITTING MULTIPLE SIGNAL, METHOD AND APPARATUS FOR RECEIVING MULTIPLE SIGNAL, MULTIPLE SIGNAL TRANSMISSION METHOD AND MULTIPLEXER/ DEMULTIPLEXER

(75) Inventor: Satoshi Kamiya, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/316,840

(22) Filed: Dec. 12, 2002

(65) Prior Publication Data

US 2003/0112833 A1 Jun. 19, 2003

(30) Foreign Application Priority Data

Dec. 18, 2001 (JP) ........................................ 2001-384558

(51) Int. Cl.
*H04L 12/28* (2006.01)

(52) U.S. Cl. ........................................ 370/466; 370/907
(58) Field of Classification Search ................ 370/907, 370/464, 466, 467, 476, 522, 535, 537, 539
See application file for complete search history.

(56) References Cited

U.S. PATENT DOCUMENTS

| | | | | |
|---|---|---|---|---|
| 6,430,201 | B1 * | 8/2002 | Azizoglu et al. | 370/535 |
| 6,816,509 | B1 * | 11/2004 | Pelley et al. | 370/466 |
| 2002/0131115 | A1 * | 9/2002 | Kasahara | 359/124 |
| 2002/0159484 | A1 * | 10/2002 | Azizoglu et al. | 370/522 |
| 2003/0016697 | A1 * | 1/2003 | Jordan | 370/466 |

FOREIGN PATENT DOCUMENTS

| | | |
|---|---|---|
| JP | 9-69835 | 3/1997 |
| JP | 11-234306 | 8/1999 |

OTHER PUBLICATIONS

Scholten et al. "Data Transport Applications Using GFP". IEEE. May 2002. pp. 96–103.*
Scholten et al. "Transparent Mapping of 8B/10B Block–Coded Client Signals Using Standard GFP Encapsulation". T1X1.5/2001–004R1. Jan. 8, 2001. pp. 1–8.*
Scholten et al. "Rate Adaptation in Transparent GFP Mapping". T1X1.5/2001–050R2. Mar. 26, 2001. pp. 1–7.*
Gorshe et al. "Transparent Generic Framing Procedure (GFP): A Protocol for Efficient Transparent of Block–Coded Data through SONET/SDH Networks". IEEE. May 2002. pp. 88–95.*
Hernandez–Valencia et al. "The Generic Framing Procedure (GFP): An Overview". IEEE. May 2002. pp. 63–71.*
ANSI X3.230–1994, Fibre Channel Physical and Signal Interface (FC–PH), pp. 63–71.

(Continued)

*Primary Examiner*—Chi Pham
*Assistant Examiner*—Derrick W Ferris
(74) *Attorney, Agent, or Firm*—Young & Thompson

(57) ABSTRACT

A client channel receiving processor unit converts each reception client signal of a 10B-character form into a GFP frame form. A mapping unit maps the client signal of the GFP frame form on a channel of virtual concatenation. A SONET/SDH processor unit transmits or receives a SONET/SDH frame, in which a GFP frame is mapped, to/from a network. A demapping unit separates each channel of the SONET/SDH frame received by the SONET/SDH processor unit. A client channel transmitting processor unit detects the client signal of the GFP frame from each separated channel to convert the signal into a 10B-character form.

6 Claims, 4 Drawing Sheets

OTHER PUBLICATIONS

"American National Standard for Telecommunications–Generic Framing Procedure", American National Standards Institute, Inc., T1.xxx.yy–200x, T1X1.5/2000–024R3 (Draft ANSI T1.xxx.yy–200x) posted in May 2001 at: http://www.ieee802.org/17 / documents / presentations/ may2001/ gfp.pdf.

Angela T. Faber, GFP Considerations for RPR, Sep. 2001, URL:http://www.ieee802.org/17/documents/presentations/sep2001/atf gfp 02.pdf.

David W. Martin, T1X1.5/99–268rl Overview, Nortel Networks, Mar. 2000 URL:http://grouper.ieee.org/groups/802/3/ae/public/mar00/martin 1 0300.pdf.

* cited by examiner

METHOD AND APPARATUS FOR TRANSMITTING MULTIPLE SIGNAL, METHOD AND APPARATUS FOR RECEIVING MULTIPLE SIGNAL, MULTIPLE SIGNAL TRANSMISSION METHOD AND MULTIPLEXER/DEMULTIPLEXER

BACKGROUND OF THE INVENTION

1. Field of the Invention

The present invention relates to a multiple signal transmission method and a multiplexer/demultiplexer for multiplex-transmission of data processed by a computer or the like. More specifically, the invention relates to a multiple signal transmission method and a multiplexer/demultiplexer for multiplexing data coded in an 8B/10B block in a SONET/SDH frame, and then demultiplexing the data.

2. Description of the Related Art

Through SONET/SDH Network, a number of signals can be efficiently multiplexed to be transmitted for a long distance at a high speed in accordance with internationally standardized multiplexing steps. Conventionally, most of traffic transmitted through a network has been voice traffic. Thus, voice signals of mainly 64 Kbps have been multiplex-transmitted through the SONET/SDH Network.

However, because of a recent increasing ratio of data traffic caused by popularization of Internet, the network is now required to transfer data traffic. The SONET/SDH Network is also required to multiplex-transmit data signals.

It is especially desired that the SONET/SDH Network transmit LAN traffic between remote points in transparency, storage data for a long distance, and digital video signals. Examples are Gigabit Ethernet used for LAN, Fibre Channel and Enterprise System Connect (ESCON) used for a storage area network, Digital Video Broadcasting-Asynchronous Serial Interface (DVB-ASI), which is a digital video signal standard, and the like. ESCON is IBM Corporation's registered trademark.

Transmission speeds of protocols of the above-described standards are different from one another. Transmission speeds of signals of a 1000BASE-SX and a 1000BASE-LX, which are general standards for Gigabit Ethernet, with a medium dependent interface (MDI) are 1250 Mbps. A transmission speed of Fibre Channel is 1062.5 Mbps. A transmission speed of ESCON is 200 Mbps. A transmission speed of DVB-ASI is 270 Mbps. None of these transmission speeds match with the multiplexing steps of the SONET/SDH Network.

One of the methods that have been made available to transmit a signal of a transmission speed unmatched with the multiplexing steps with a SONET/SDH frame uses a padding byte. According to this method, a frame having a payload band equal to/higher than the transmission speed of the signal to be transmitted is used. Then, in order to match the signal with the multiplexing steps of the SONET/SDH Network, the padding byte is inserted into an extra part of the payload.

In addition, a virtual concatenation standard has been drawn up in ITU-T G. 707 to improve transmission efficiency for the case when the signal having the transmission speed unmatched with the multiplexing steps is transmitted in a SONET/SDH frame.

In virtual concatenation, an optional number of paths are virtually integrated by using STS-1/VC-3 or STS-3c/VC-4 as a path unit to make a channel of a desired payload band. For example, in order to receive a signal having a transmission speed of 1250 Mbps, nine STS-3c/VC-4's may be integrated to make a channel of a payload band set to 1347.84 Mb/s. According to the virtual concatenation standard, this channel is represented by STS-3c-9v/VC-4-9v.

Incidentally, 8B/10B block coding is employed for physical layers of the above-described Gigabit Ethernet, Fibre Channel, ESCON, and DVB-ASI. The 8B/10B block coding is described in detail in ANSI X3.230-1994, Fibre Channel Physical and Signaling Interface (FC-PH), pp.63–71.

In the 8B/10B block coding, data of an 8-bit unit is converted into a 10-bit code for every 8 bits in accordance with a predetermined coding rule. Original 8 bits are called a byte, and a 10-bit code that is a result of byte conversion is called a character. In the specification, they are respectively referred to as an 8B byte and a 10B character.

According to an 8B/10B coding rule, six or more identical codes never continue in a 10B-character signal. In addition, according to the 8B/10B coding rule, two opposite 10B characters of numerals "0" and "1" are set for each 8B byte. Then, one of the two 10B characters is selected in accordance with numerals "0" and "1" of former 10B character. Thus, because of many changing points contained in the 10B-character signal, a clock and data can be easily extracted.

The 10B character of the 8B/10B block code is defined to express data codes of 256 types and control codes of 12 types. Normally, a data code is represented by Dxx. Y, and a control code is represented by Kxx. Y. Each data code corresponds to 256 8B bytes represented by 8 bits. A combination of 10 bits, which are not used as a data code, is allocated to the control code. The control code is used for transmitting control information regarding a character synchronization pattern, link disconnection or the like. The 8B/10B block coding enables data to be transmitted in transparency, and also a variety of control information to be transmitted.

However, when a padding byte is inserted into a payload in order to multiplex the signal of which transmission speed unmatches with the multiplexing steps, transmission efficiency of the SONET/SDH frame declines.

As an example, consideration is now given to a case of transmitting a 1250 Mbps signal of Gigabit Ethernet. Since a payload band of STS-12c/VC-4-4c is 149.76 Mbps×4= 599.04 Mbps, the signal of the transmission speed 1250 Mbps cannot be directly received. Thus, STS-48c/VC-4-16c higher than the STS-12c/VC-4-4 must be used. A payload band of the STS-48c/VC-4-16c is 2396.16 Mbps and, when the signal of the transmission speed 1250 Mbps is received, only 52% of the payload band is used. Therefore, transmission efficiency is extremely low.

On the other hand, transmission efficiency is improved by using the virtual concatenation when the signal of the transmission speed unmatched with the multiplexing steps is multiplexed in the SONET/SDH frame.

However, a signal is transmitted by a byte unit in the payload of the SONET/SDH. When a 10B character is transmitted through the SONET/SDH, a function to establish character synchronization by a control code is necessary. Consequently, the process is redundant.

Data of the 10B character is processed by a character unit. Thus, a unit of data processing is different from that of the SONET/SDH to complicate a processing circuit.

On the other hand, the 10B character may be decoded to 8B byte data to be transmitted. In transmission of an 8B-byte signal, the function to establish character synchronization is not necessary. As the 8B-byte signal is processed by a byte unit similar to that of the SONET/SDH, a processing circuit is simple. Moreover, a payload band necessary for transmitting 8B-byte data is 80% of that necessary for transmitting the 10B character. Therefore, it can be said that an 8B byte is suitable for transmitting data, reliability of which is supported by a high-order protocol.

For example, a transmission speed of the 10B character through Gigabit Ethernet is 1250 Mbps. When it is converted into an 8B-byte data, however, the transmission speed becomes 1000 Mbps. Accordingly, when the data of Gigabit Ethernet is decoded to 8B-byte data, and the virtual concatenation is applied, the data can be transmitted by STS-3c07v/VC-4-7v of a payload band of 1048.32 Mbps. That is, if seven STS-3c/VC-4's are connected, data of gigabyte Ethernet can be transmitted. Therefore, OC 48/STM-16 of a transmission speed 2488.32 Mbps enables data of 2-channel Gigabit Ethernet to be transmitted, whereby transmission efficiency can be greatly improved.

However, in a protocol using 8B/10B block coding, a frame boundary is identified by a control code. Accordingly, in practice, in order to decode the 10B-character data to 8B-byte data to transmit it in transparency, encapsulation must be carried out by another variable length frame technology.

Furthermore, in Fibre Channel and ESCON, boundary information (frame start information, end information or the like) or link state information of a data frame is transferred based on a plurality of control codes or a combination of a control code with a data code. Thus, if the data is simply decoded to 8B-byte data, control information transferred by a 10B character will be lost.

SUMMARY OF THE INVENTION

An object of the present invention is to provide a multiplexer/demultiplexer, which uses 8B/10B block coding, and efficiently multiplexes a signal unmatched with multiplexing steps of a SONET/SDH in a SONET/SDH frame to transmit it in transparency.

The present invention provides a multiple signal transmission method for multiplexing at least one client signal in a SONET/SDH frame to transmit the signal by using 8B/10B block coding, comprising the steps of: converting the client signal of a 10B character into a GFP frame form by a transparent GFP; mapping the client signal converted into the GFP frame form on a predetermined channel of virtual concatenation; and transmitting the SONET/SDH frame, in which the channel is multiplexed.

The present invention provides a multiple signal transmission method for receiving a multiple signal, in which at least one client signal is multiplexed in a SONET/SDH frame, by using 8B/10B block coding, comprising the steps of: receiving the SONET/SDH frame; separating each channel multiplexed in the SONET/SDH frame; detecting the client signal of a GFP frame form from the channel; and converting the client signal of the GFP frame form into a 10B-character form by a transparent GFP.

The present invention provides a multiple signal transmission method for transmitting a multiple signal, in which at least one client signal is multiplexed in a SONET/SDH frame, from a transmitter to a receiver by using 8B/10B block coding, comprising the steps of: transmitting the multiple signal from the transmitter; and receiving the multiple signal by the receiver. Here, the transmission step is provided with the steps included in the above-described multiple signal transmission method.

Alternatively, the present invention provides a multiple signal transmission method for transmitting a multiple signal, in which at least one client signal is multiplexed in a SONET/SDH frame, from a transmitter to a receiver by using 8B/10B block coding, comprising the steps of: transmitting the multiple signal from the transmitter; and receiving the multiple signal by the receiver. Here, the receiving step is provided with the steps included in the above-described multiple signal transmission method.

Otherwise, the present invention provides a multiple signal transmission method, comprising the steps of: transmitting a multiple signal, in which at least one client signal is multiplexed in a SONET/SDH frame, by using 8B/10B block coding; and receiving the multiple signal. Here, the transmission step includes the steps of converting the client signal of a 10B-character form into a GFP frame form by a transparent GFP, mapping the client signal converted into the GFP frame form on a predetermined channel of virtual concatenation, and transmitting the SONET/SDH frame, in which the channel is multiplexed. The receiving step includes the steps of receiving the SONET/SDH frame, separating the channel multiplexed on the SONET/SDH frame, detecting the client signal of the GFP frame form from the channel, and converting the client signal of the GFP frame form into a 10B-character form by a transparent GFP.

The present invention provides a multiplexer/demultiplexer for multiplex-transmitting at least one client signal in a SONET/SDH frame by using 8B/10B block coding, comprising: a client channel receiving processor unit for converting each reception client signal of a 10B-character form into a GFP frame form by a transparent GFP; a mapping unit for mapping the client signal converted into the GFP frame form on a predetermined channel of virtual concatenation; a SONET/SDH processor unit for transmitting the SONET/SDH frame, in which the reception client signal of the GFP frame form is mapped, to a SONET/SDH network, and for receiving a SONET/SDH frame, in which at least one transmission client signal of a GFP frame form is mapped, from the SONET/SDH network; a depmapping unit for separating each channel of virtual concatenation multiplexed in the SONET/SDH frame received by the SONET/SDH processor unit; and a client channel transmitting processor unit for detecting each client signal of a GFP frame form from the channel separated from the demapping unit, and for converting the detected client signal of the GFP frame form into a 10B-character form by a transparent GFP.

The present invention provides a multiple signal transmission apparatus for multiplexing at least one client signal in a SONET/SDH frame to transmit the signal by using 8B/10B block coding, comprising: a GFP frame generation unit for converting the client signal of a 10B-character form into a GFP frame form by a transparent GFP; a VC mapping unit for mapping the client signal converted into the GFP frame form on a predetermined channel of virtual concatenation; and a SONET/SDH transmitting unit for transmitting a SONET/SDH frame, in which the channel is multiplexed.

The present invention provides a multiple signal receiving apparatus for receiving a multiple signal, in which at least one client signal is multiplexed in a SONET/SDH frame, by using 8B/10B block coding, comprising: a SONET/SDH receiving unit for receiving the SONET/SDH frame; a VC demapping unit for separating each channel multiplexed in the SONET/SDH frame; a GFP frame termination unit for detecting the client signal of a GFP frame form in the channel; and a TGFP termination unit for converting the client signal of the GFP frame form into a 10B-character form by a transparent GFP.

The present invention provides a multiple signal transmission apparatus for transmitting a multiple signal, in which at least one client signal is multiplexed in a SONET/SDH frame, from a transmitter to a receiver by using 8B/10B block coding, comprising: a multiple signal transmitting unit for transmitting the multiple signal from the transmitter; and a multiple signal receiving unit for receiving the multiple signal by the receiver. Here, the multiple signal-transmitting unit includes the above-described multiple signal transmitting apparatus.

Alternatively, the present invention provides a multiple signal transmission apparatus for transmitting a multiple signal, in which at least one client signal is multiplexed in a SONET/SDH frame, from a transmitter to a receiver by using 8B/10B block coding, comprising: a multiple signal transmitting unit for transmitting the multiple signal from the transmitter; and a multiple signal receiving unit for receiving the multiple signal by the receiver. Here, the multiple signal receiving unit includes the above-described multiple signal receiving apparatus.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENT

Next, detailed description will be made of an embodiment of the present invention with reference to the accompanying drawings.

Figure 1:
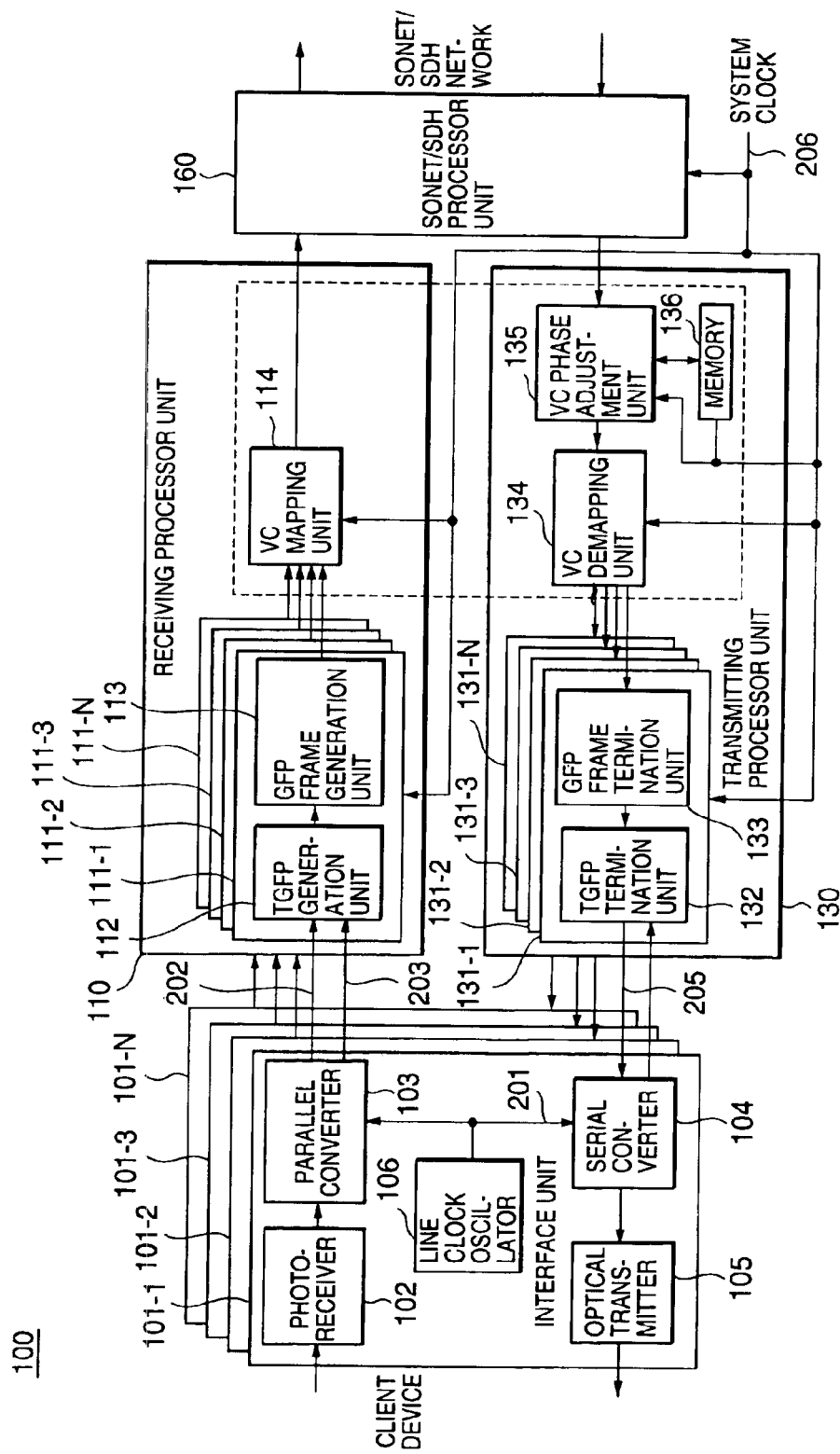
FIG. 1 is a block diagram showing a constitution of a data multiplexer/demultiplexer according to an embodiment of the present invention.

FIG. 1 is a block diagram showing a configuration of a data multiplexer/demultiplexer according to an embodiment of the present invention. Referring to FIG. 1, the data multiplexer/demultiplexer 100 of the embodiment comprises interface units 101-1 to 101-N, a receiving processor unit 110, transmitting processor unit 130, a SONET/SDH processor unit 160.

A not-shown network device, constituting a SONET/SDH network, is connected to the SONET/SDH processor unit 160. The network device is, for example, a SONET/SDH transmitter or a data multiplexer/demultiplexer similar to the present data multiplexer/demultiplexer.

The interface units 101-1 to 101-N are connected to a not-shown client device in accordance with a client protocol such as Gigabit Ethernet, Fibre Channel, ESCON or DVB-ASI. The client device is, for example, a computer for transmitting/receiving data through Gigabit Ethernet or the like.

At least one of the interface units 101-1 to 101-N exists in the data multiplexer/demultiplexer 100. Here, a case where N of interface units exist is illustrated. Each of the interface units 101-1 to 101-N includes a photoreceiver 102, a parallel converter 103, a serial converter 104, an optical transmitter 105, and a line clock oscillator 106.

The receiving processor unit 110 includes client channel receiving processor units 111-1 to 111-N, and a VC mapping unit 114.

At least one of the client channel receiving processor units 111-1 to 111-N exists in the receiving processor unit 110. Here, a case where N of client channel receiving processor units exist is illustrated. Each of the client channel receiving processor units 111-1 to 111-N includes a Transparent Generic Framing Procedure (TGFP) generation unit 112 and a Generic Framing Procedure (GFP) frame generation unit 113.

The transmitting processor unit 130 includes client channel transmitting processor units 131-1 to 131-N, a VC demapping unit 134, a VC phase adjustment unit 135, and a memory 136.

At least one of the client channel transmitting processor units 131-1 to 131-N exists in the transmitting processor unit 130. Here, a case where N of client channel receiving processor units exist is illustrated.

The interface unit 101-1 is connected to the client channel receiving processor unit 111-1 and the client channel transmitting processor unit 131-1. The interface unit 101-1 transmits reception parallel data 202 and a reception line clock 203 to the client channel receiving processor unit 111-1. The interface unit 101 also transmits a transmission line clock 204 to the client channel transmitting processor unit 131, and receives transmission parallel data 205 from the client channel transmitting processor unit 131.

Similarly, each interface unit is connected to corresponding client channel receiving and transmitting processor units.

The interface unit 101 executes transmission/reception of an optical signal to/from the not-shown client device, conversion between an optical signal and an electric signal, conversion between a serial signal and a parallel signal, and extraction of a clock and data from a received signal.

A different interface unit 101 is prepared for each client protocol. For an electric side interface of the interface unit 101 of each protocol, a clock speed varies depending on the protocol. However, a 10-bit parallel state in each 10B character regarding to a signal converted into an 8B/10B block code is common. For example, a clock speed of a 10-bit parallel signal is 125 MHz at the interface unit 101 for Gigabit Ethernet, 106.25 MHz at the interface unit 101 for Fibre Channel, 27 MHz at the interface unit 101 for DVB-ASI, and 20 MHz at the interface unit 101 for ESCON.

The photoreceiver 102 converts an optical signal received from the client device into an electric signal, and transmits the electric signal to the parallel converter 103.

The parallel converter 103 extracts a clock from a serial electric signal received from the photoreceiver 102, and supplies the clock as a reception line clock 203 to the TGFP generation unit 112. In this case, the parallel converter 103 extracts the clock by an existing technology for synchronizing a reference clock 201 supplied from the line clock oscillator 106 with reception parallel data 202 by a PLL, or the like.

In addition, the parallel converter 103 detects a character synchronization pattern of a 10B character from the serial signal received from the photoreceiver 102 to establish character synchronization. The parallel converter 103 converts the received serial electric signal into a 10-bit parallel signal for each 10B character, and transmits the 10-bit parallel signal as reception parallel data 202 to the TFGP generation unit 112.

The serial converter 104 receives transmission parallel data 205, which is 10-bit parallel, from a TFGP termination unit 132, and converts the transmission parallel data 205 into a-serial signal to transmit the serial signal to the optical transmitter 105. As shown in FIG. 1, here, the serial converter 104 supplies the reference clock 201 received from the line clock oscillator 106 as a transmission line clock 204 to the TGFP termination unit 132. However, the reception line clock 203 may be supplied as a transmission line clock 204 to the TGFP unit 131.

The optical transmitter 105 converts the serial electric signal received from the serial converter 104 into an optical signal to transmit the optical signal to the not-shown client device.

The receiving processor unit 110 converts a signal received from the interface unit 101 into a TGFP data form to form a GFP frame, and executes a transmission process of virtual concatenation.

Each of the client channel receiving processor units 111-1 to 111-N receives a 10B-character signal from each of the corresponding interface units 101-1 to 101-N to subject the 10B-character signal to TGFP processing, and then transmits a GFP frame to the VC mapping unit 114. At this time, the TGFP generation unit 112 converts the signal received from the interface unit 101 into a TGFP form. The GFP frame generation unit 113 generates a GFP frame based on the signal converted into the TGFP form by the TGFP generation unit 112.

The VC mapping unit 114 takes out the GFP frame from each of the client channel receiving processor units 111-1 to 111-N in accordance with a predetermined virtual concatenation band, and inserts the GFP frame into a payload of an STS-1/VC-3 or an STS-3c/VC-4 of a SONET/SDH frame. Then, the VC mapping unit 114 imparts a path overhead (POH) to the STS-1/VC-3 or the STS-3c/VC-4 to transmit the SONET/SDH frame to the SONET/SDH processor unit 160.

The transmitting processor unit 130 terminates the virtual concatenation of the frame received from the SONET/SDH processor unit 160 to take out the signal of each channel, terminates the GFP frame of each signal, converts the signal of the TGFP form into a 10B character, and then transmits the 10B character as transmission parallel data 205 to each of the interface units 101-1 to 101-N corresponding to each channel.

The VC phase adjustment unit 135 adjusts a phase of a path of each STS-1/VC-3 or STS-3c/VC-4, which is connected to each other by virtual concatenation in a frame and is received from the SONET/SDH processor unit 160 by using a memory 136, to transmit the frame to the VC demapping unit 134.

For the phase adjustment, the memory 136 temporarily stores a signal of a path to be delayed.

The VC demapping unit 134 receives a signal, in which the phases in the payload of the SONET/SDH match with each other, from the VC phase adjustment unit 135, separates the signal for respective channels to the client devices, and transmits the separated signals to the respective client channel transmitting processor units 131-1 to 131-N.

Each of the client channel transmitting processor units 131-1 to 131-N detects a GFP frame of the signal received from the VC demapping unit 134, and decodes a 10B character from the detected GFP frame. At this time, the GFP frame termination unit 133 that has receives the signal from the VC demapping unit 134 detects the GFP frame, and notifies the received signal and a signal indicating a GFP frame position to the TGFP termination unit 132. The TGFP termination unit 132 takes out data of a TGFP form from the GFP frame received from the GFP frame termination unit 133 to decode the 10B character.

The SONET/SDH processor unit 160 imparts a pointer and a section overhead (SOH) to the SONET/SDH frame received from the receiving processor unit 110 to transmit the SONET/SDH frame to a not-shown transmitter. In addition, the SONET/SDH processor unit 160 executes synchronization of the SONET/SDH frame received from the network device, section termination, detection of a payload position by the pointer, and path termination, and then transmits the SONET/SDH frame to the transmitting processor unit 130.

Processing of each of the client channel receiving processor units 111-1 to 111-N and the client channel transmitting processor units 131-1 to 131-n is called TGFP.

In ANSI T1X1.5, standardization of a generic framing procedure (GFP) standard has been pursued. According to draft GFP specifications, for GFP, standardization of a framing technology for encapsulating a frame of Ethernet, PPP or the like to transmit through SONET/SDH has been pursued. In addition, the GFP standard includes TGFP, which is a standard for band-compressing a data code and a control code that have been subjected to 8B/10B block coding without reducing transparency to encapsulate the codes.

In the embodiment, the TGFP is used. Now, TGFP processing will be described in detail. The TGFP has a data compression function and a rate adjustment function.

First, the data compression function of the TGFP is described.

The signal that each of the client channel receiving processor units 111-1 to 111-N has received from the interface unit 101 is in the form of a 10B character. Each of the client channel receiving processor units 111-1 to 111-N subjects the 10B character to 64B/65B conversion. Each of the client channel transmitting processor units 131-1 to 131-N executes opposite conversion.

The 64B/65B conversion means conversion of eight 10B characters into a 65-bit block. The 65-bit block after the 64B/65B conversion is called a 65B block. In other words, in the 64B/65B conversion, the eight 10B characters are inputs, and the 65B block is an output. By this conversion the number of bits is reduced from 80 bits to 65 bits, and a band is compressed to 81.25% (=65/80).

Figure 2:
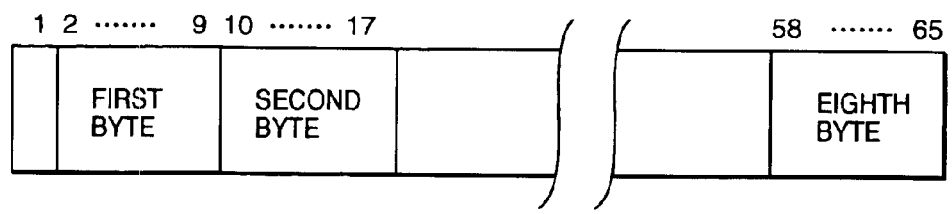
FIG. 2 is a chart illustrating a structure of a 65B block.

FIG. 2 is a chart illustrating a structure of the 65B block. Referring to FIG. 2, 1 bit at a head of the 65B block is "0" only when the entered eight 10B characters are all data codes. If even one control code is included in the eight 10B characters, a bit at the head is "1". 64 bits from second to 65th bits are divided into eight-byte areas, each containing 8 bits. A first byte is from the second to ninth bits, a second byte is from tenth to seventeenth bits, and similar thereafter to an eighth byte from 58th to 65th bits.

Each area stores an 8-bit code, which is converted from a 10B-character. However, if a control code is included in the entered eight 10B characters, the input order of the 10B characters and the storage order of the 8-bit code, which is converted from a 10B-character, are different from each other. The control signals are stored en block from the 1st byte in order, and then the data codes are stored en block.

For the codes to be stored, if the 10B character is a data code, an 8B byte decoded from the 10B character is stored in the byte area. If the 10B character is a control code, an 8-bit code called a degeneration control code is stored in the byte area.

Figure 3:
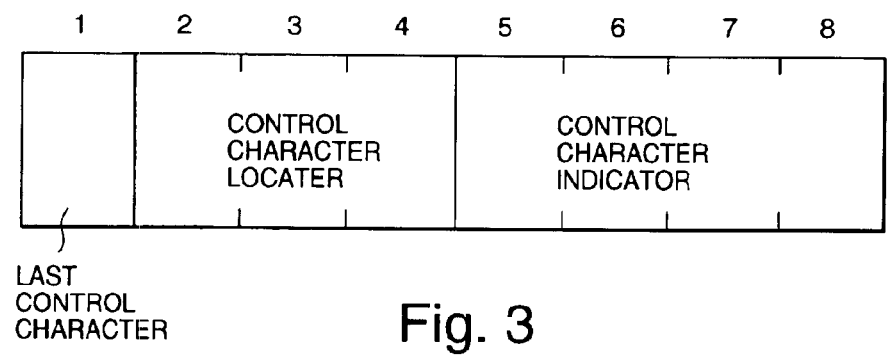
FIG. 3 is a chart illustrating a structure of a degeneration control code.

FIG. 3 is a chart illustrating a structure of the degeneration control code. Referring to FIG. 3, the degeneration control code is constituted of thee areas, i.e., a last control character, a control character locator, and a control character indicator.

The 1st bit is the last control character. The control codes are stored en block at the head of the 65B block. If a control code continues in a next byte area, the last control character is "1". If the control code is last, the last control character is "0".

3 bits from the 2nd to 4th bits indicate the control character locator. Positions of control codes in the eight 10B characters before replacement are represented by binary data of "000(=0)" to "111(=7)".

For example, if eight 10B characters are entered in order of D1, D2, K1, D4, D5, D6, and K2 (D is a data code, and K is a control code), K1, K2, D1, D2, D3, D4, D5, and D6 are stored in this order in the 1st to 8th bytes of the 65B block. At this time, a last control character of K1 is "1," and a control character locator is "011(=3)". A last control character of K2 is "0," and a control character locator is "111(=7)."

4 bits from the 5th to 8th bits indicate the control character indicator. This is a code, in which a control code is represented by 4 bits.

According to the above-described 64B/65B conversion, the number of bits for the control code is reduced, and position information is stored in the 8-bit code. Thus, the 10B-character signal, in which the data and control codes are mixed, is band-compressed while transparency is maintained.

In addition, in the TGFP, a super block that includes eight 65B blocks is formed. A CRC-16 is imparted to each super block. The CRC-16 is used for detecting errors. Thus, one super block contains (65×8+16)/8=67 bytes.

Further, in the TGFP, a GFP frame that includes a plurality of super blocks in a payload is made.

Figure 4:
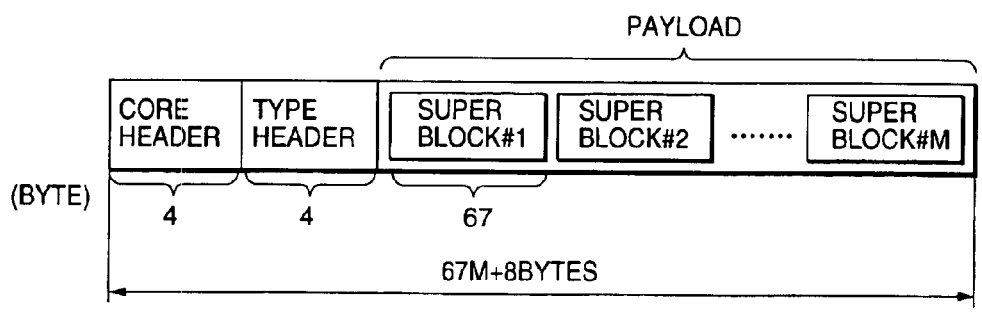
FIG. 4 is a chart illustrating a structure of a GFP frame.

FIG. 4 is a chart illustrating a structure of the GFP frame. Referring to FIG. 4, the GFP frame is constituted of a 4-byte core header, a 4-byte type header, and a payload. The payload stores M of 67-byte super blocks. Accordingly, a frame size is 67M+8 bytes.

The GFP frame includes information regarding 64M of 10B characters. Thus, the number of bits for transmitting information by use of the GFP frame is 8×(67M+8)/(10×64M) times that for transmitting the same information in the form of the 10B character. A compression rate varies depending on a value of M, which is 83.75% (M→∞ limit value) to 93.75% (M=1).

Next, the rate adjustment function of the TGFP is described. The rate adjustment function of the TGFP consists of two functions.

One is to insert a padding when data compressed by 64B/65B conversion is supplied to a transmission line of a fixed band larger than that of the data. The other is to adjust a signal speed difference and fluctuation between the transmitting and receiving sides.

Now, the padding insertion of the TGFP is described.

The GFP frame is transmitted on a transmission line of a payload band larger than its transmission speed. For example, the GFP frame is transmitted through a channel of a band larger than a transmission speed of the GFP frame made by virtual concatenation of the SONET/SDH. Then, a padding is inserted into a payload of the channel to eliminate the band difference.

In the TGFP, a degeneration control code is defined for the padding, which is inserted in coding of 64B/65B conversion, and removed in decoding. The padding code is represented by 65B_PAD.

Now, the rate adjustment of the TGFP is described.

If the TGFP is used in the midway, and a 10B-character signal is transmitted between ends, a speed of a clock on the transmission line of the midway (e.g., SONET/SDH) is different from that of a clock at the transmission side (e.g., Gigabit Ethernet). Accordingly, when a 10B character is decoded from the GFP frame to be transmitted to the client device of the receiving side, the multiplexer/demultiplexer must reproduce a clock for transmitting the 10B-character signal.

As a clock reproducing method, there is a method of providing and using a local clock source. In this case, a speed difference and fluctuation is generated within a range defined by the standard between transmission side and receiving side clocks. Thus, the speed difference and the fluctuation must be compensated for. In the TGFP, an idle pattern is inserted if necessary when the signal is converted from the 10B-character form into a TGFP form, and the idle pattern is removed if necessary when the signal is converted from the TGFP form into the 10B-character form, whereby the speed difference and the fluctuation are absorbed.

In the embodiment, the reference clock 201 of the line clock oscillator 106 is used as a reproducing clock.

Figure 5:
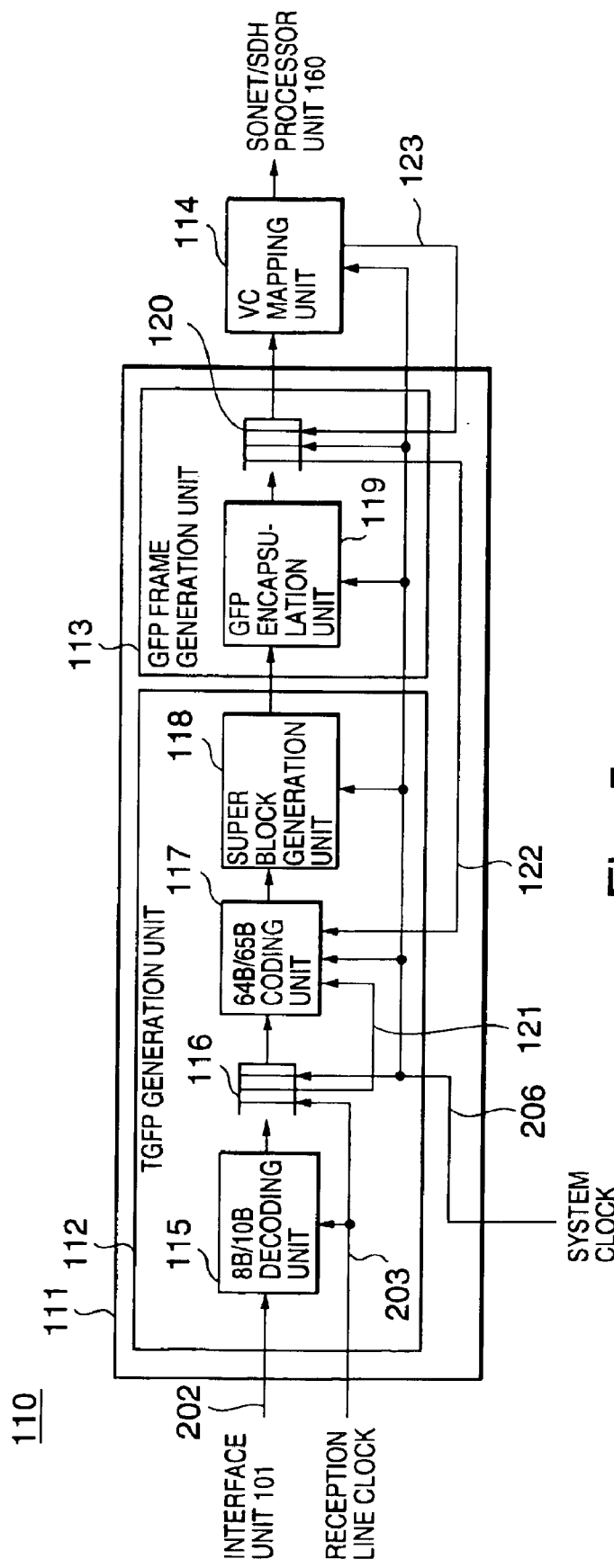
FIG. 5 is a block diagram showing a detailed constitution of a receiving processor unit of FIG. 1.

FIG. 5 is a block diagram showing a detailed configuration of the receiving processor unit of FIG. 1. As described above, the receiving processor unit 110 includes at least one of the client channel receiving processor units 111-1 to 111-N. The client channel receiving processor units 111-1 to 111-N shown in FIG. 1 are all similar to one another in basic configuration. Accordingly, in FIG. 5, for simple explanation, one of the client channel receiving processor units 111 is shown.

Thus, referring to FIG. 5, the receiving processor unit 110 includes the client channel receiving processor unit 111 and the VC mapping unit 114.

The client channel receiving processor unit 111 includes the TGFP generation unit 112 and the GFP frame generation unit 113.

The TGFP generation unit 112 includes an 8B/10B decoding unit 115, a reception 8B data FIFO 116, a 64B/65B coding unit 117, and a super block generation unit 18. The GPF generation unit 113 includes a GFP encapsulation unit 119, and a GFP frame FIFO 120.

The 8B/10B decoding unit 115 receives 10-bit parallel reception parallel data 202 from the interface unit 101, decodes a data code from a 10B character to 8B byte data, and identifies a control code in the 10B character to convert the control code into a degeneration control code. Then, the 8B/10B decoding unit 115 writes the 8B byte data and the degeneration control code into the reception 8B data FIFO 116.

The 8B byte data and the degeneration control code have been written into or read from the reception 8B data FIFO 116. When the reception 8B data FIFO 116 becomes empty, the reception 8B data FIFO 116 sets up an 8B data empty flag 121 to notify an empty state to the 64B/65B coding unit 117.

The 64B/65B coding unit 117 reads the 8B byte data and the degeneration control code from the reception 8B data FIFO 116 to form a 65B block for every eight pieces of 8B byte data pieces and degeneration control codes. In addition, the 64B/65B coding unit 117 uses a rate adjustment degeneration control code 65B_PAD for 64B/65B coding when the reception 8B data FIFO 116 is empty, and the number of GFP frames placed on standby for being read from the GFP frame FIFO 120 is equal to or lower than a predetermined value. Then, the 64B/65B coding unit 117 transmits the formed 65B block to the super block generation unit 118.

The super block generation unit 118 receives the 65B block from the 64B/65B coding unit 117, and imparts CRC-16 codes to 8 groups of 65B blocks to form a 67-byte super block. The super block generation unit 118 transmits the super block to the GFP encapsulation unit 119.

The GFP encapsulation unit 119 receives the super block from the super block generation unit 118, stores a predetermined number of super blocks in one GFP frame, and imparts a type header and a core header to the GFP frame to write the GFP frame into the GFP frame FIFO 120. The number of super blocks to be stored in one GFP frame can be defined based-on a proper compression rate obtained from a ratio of a transmission speed of a client protocol to a payload band of the SONET/SDH, which has been virtual-concatenated, and can be set from the outside.

The GFP fame FIFO 120 accumulates a GFP frame written from the GFP encapsulation unit 119, and reads the GFP frame in accordance with a GFP frame reading signal 123 from the VC mapping unit 114 to transmit the GFP frame to the VC mapping unit 114. In addition, the GFP fame FIFO 120 notifies GFP frame accumulation information 122 to the 64B/65B coding unit 117. The GFP fame accumulation information 122 indicates the number of GFP frames placed on standby for being read from the GFP frame FIFO 120. When the number of GFP frames placed on standby for being read from the GFP frame FIFO 120 is smaller than a predetermined value, and when the reception 8B data FIFO 116 is empty, the 64B/65B coding unit 117 uses the rate adjustment degeneration control code 65B_PAD for the 64B/65B coding. Accordingly, underflowing of the GFP frame FIFO 120 is prevented.

An operation in the 8B/10B decoding unit 115 and a writing operation into the reception 8B data FIFO 116 are synchronized with a reception line clock 203. An operation of each of the other units in the receiving processor unit 111 is synchronized with a system clock 206 as in the case of the SONET/SDH processor unit 160.

Figure 6:
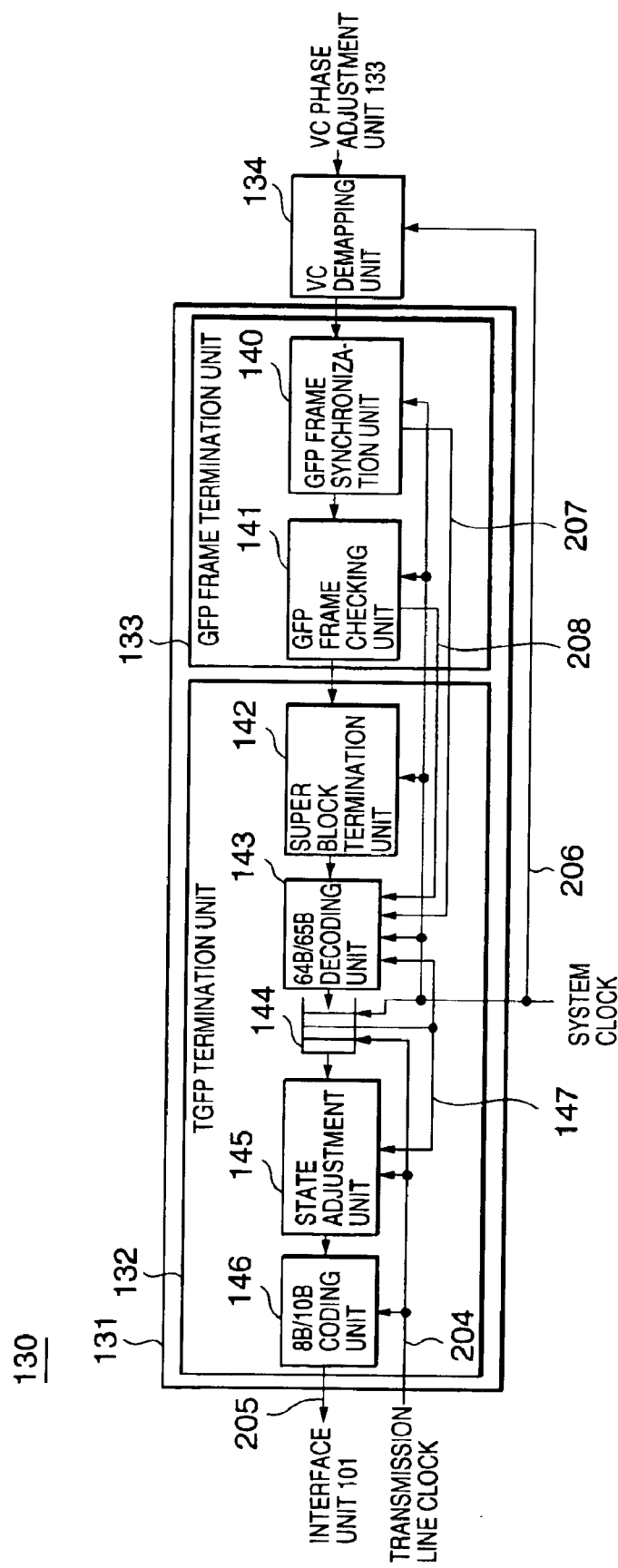
FIG. 6 is a block diagram showing a detailed constitution of a transmitting processor unit of FIG. 1.

FIG. 6 is a block diagram showing a detailed configuration of the transmitting processor unit of FIG. 1. As described above, the transmitting processor unit 130 includes at least one of the client channel transmitting processor units 131-1 to 131-N. The client channel transmitting processor units 131-1 to 131-N shown in FIG. 1 are all similar to one another in basic configuration. Accordingly, in FIG. 6, for simple explanation, one of the client channel transmitting processor units 131 is shown.

Similarly, in FIG. 6, for simple explanation, the VC phase adjustment unit 135 and the memory 136 are not shown.

Thus, referring to FIG. 6, the transmitting processor unit 130 includes the client channel transmitting processor unit 131 and the VC demapping unit 134.

The client channel transmitting processor unit 131 includes the TGFP termination unit 132 and the GFP frame termination unit 133.

The TGFP termination unit 132 includes a super block termination unit 142, a 64B/65B decoding unit 143, a transmission 8B data FIFO 144, a rate adjustment unit 145, and an 8B/10B coding unit 146. The GPF termination unit 133 includes a GFP frame synchronization unit 140 and a GFP frame checking unit 141.

The GFP frame synchronization unit 140 receives data of a virtual-concatenated path of the SONET/SDH frame received from the VC demapping unit 134 to detect a boundary of a GFP frame. The GFP fame synchronization unit 140 transmits the GFP frame to the GFP frame checking unit 141, and notifies the detected boundary thereto. The GFP frame synchronization unit 140 notifies a 10B_ERR transmission request 207 to the 64B/65B decoding unit 143 when it cannot detect the GFP frame boundary. The 10B_ERR transmission request 207 is a signal for requesting the 64B/65B decoding unit 143 to transmit a control code 10B_ERR. The control code 10B_ERR is for notifying the client device that a normal 10B character cannot be transmitted.

The GFP frame checking unit 141 checks a type header of the GFP frame, boundary of which has been detected by the GFP frame synchronization unit 140. If no errors are detected by the type header checking, a payload of the GFP frame is transmitted to the super block termination unit 142.

If an error is detected by the type header checking, the GFP frame checking unit 141 transmits a 10B_ERR transmission request 208 to the 64B/65B decoding unit 143. Upon receiving the 10B_ERR transmission request 208, the 64B/65B decoding unit 143 transmits 10B_ERR during a period of the GFP frame, in which the error has been detected.

The super block termination unit 142 checks errors of CRC 16 of each super block stored in the payload received from the GFP frame checking unit 141. If no errors are detected by the CRC error checking, the super block termination unit 142 decodes the super block to eight 65B blocks, and sequentially transmits these blocks to the 64B/65B decoding unit 143. If an error of CRC-16 is detected, the super block termination unit 142 transmits the eight 65B blocks including eight control codes 10B_ERR to the 64B/65B decoding unit 143 during a period of the super block.

The 64B/65B decoding unit 143 decodes the 65B block to a 64B code constituted of eight 8B-byte data and a degeneration control code. At this time, the 64B/65B decoding unit 143 writes the 8B-byte data and the degeneration control data excluding 65B_PAD into a transmission 8B data FIFO 144. The 65B_PAD is discarded without being written into the transmission 8B data FIFO 144.

The 64B/65B decoding unit 143 writes eight 10B_ERR codes as a 64B code into the transmission 8B data FIFO 144 if the 65B block cannot be decoded normally.

Upon reception of the 10B_ERR transmission request 207 from the GFP frame synchronization unit 140 or the 10B_ERR transmission request 208 from the GFP frame checking unit 141, the 64B/65B decoding unit 143 writes the 10B_ERR code into the transmission 8B data FIFO 144.

In addition, the 64B/65B decoding unit 143 interprets the decoded 8B-byte data or degeneration control code to detect an idle pattern of a client protocol. The 64B/65B decoding unit 143 receives 8B data buffer length information 147 from the transmission 8B data FIFO 144 to monitor the number of 8B-byte data or degeneration control codes placed on standby for being read from the transmission 8B data FIFO 144. If the number of 8B-byte data or degeneration control codes placed on standby for being read from the transmission 8B data FIFO 144 is equal to or higher than a predetermined value, the detected idle pattern is discarded without being written into the transmission 8B data FIFO 144.

For the transmission 8B data FIFO 144, the 8B-byte data and the degeneration control code have been written by the 64B/65B decoding unit 143, and read by the rate adjustment unit 145. The number of 8B-byte data pieces or degeneration control codes placed on standby for being read has been notified as the 8B data buffer length information 147 to the rate adjustment unit 145 and the 64B/65B decoding unit 143.

The rate adjustment unit 145 reads the 8B-byte data and the degeneration control code from the transmission 8B data FIFO 144. In this case, the rate adjustment unit 145 refers to the 8B data buffer length information 147 from the transmission 8B data FIFO 144 to adjust the readout.

Normally, the rate adjustment unit 145 periodically reads the 8B-byte data and the degeneration control code from the transmission 8B data FIFO 144 based on a transmission rate for 8B byte of the client protocol to transmit the 8B-byte data and the degeneration control code to the 8B/10B coding unit 146.

If the number of data pieces placed on standby for being read from the transmission 8B data FIFO 144 becomes equal to or lower than the predetermined value, the rate adjustment unit 145 stops data reading from the transmission 8B data FIFO 144 at a point of time when the pre-detected idle pattern comes to a reading head of the transmission 8B data FIFO 144 to transmit the idle pattern to the 8B/10B coding unit 146.

The 8B/10B coding unit 146 converts the 8B byte data and the degeneration control code received from the rate adjustment unit 145 into a 10B character, and transmits it as 10-bit parallel transmission parallel data 205 to the interface unit 101.

The operations of the 8B/10B coding unit 146 and the rate adjustment unit 145 and the reading operation from the transmission 8B data FIFO 140 are synchronized with a transmission line clock 204. Each of other units in the transmitting processor unit 130 is synchronized with the system clock 206 as in the case of the SONET/SDH processor unit 160.

Next, description will be made of an operation of the multiplexer/demultiplexer 100 along a flow of a signal in a direction from the client device to the SONET/SDH network.

First, the interface unit 101 receives a 10B character of a signal from the client device. The 8B/10B decoding unit 115 decodes the 10B character to 8B-byte data, and writes the decoded 8B-byte data into the reception 8B data FIFO 116. The 64B/65B coding unit 117 reads the 8B-byte data from the reception 8B data FIFO 116. At this time, if the reception 8B data FIFO 116 is empty, and if the number of GFP frames placed on standby for being read, which has been notified through the GFP frame accumulation information 122 from the GFP frame FIFO 120, is smaller than the predetermined value, the 64B/65B coding unit 117 inserts the padding (65B_PAD). By inserting the padding, the GFP frame FIFO 120 is prevented from underflowing.

A virtual concatenation channel is set so that a payload band of the SONET/SDH is larger than a transmission speed of a client signal to cause underflowing in the reception 8B data FIFO 116.

The 64B/65B coding unit 117 converts the 8B-byte data read from the 8B data FIFO 116 into a 65B block. The super block generation unit 118 generates a super block with eight 65B blocks. The GFP encapsulation unit 119 stores a predetermined number of super blocks in a GFP frame, and writes the GFP frame into the GFP frame FIFO 120. The VC mapping unit 114 places the GFP frame on the virtual-concatenated SONET/SDH channel. The SONET/SDH processor unit 160 transmits the SONET/SDH frame to the SONET/SDH network device.

Now, description will be made of an operation of the multiplexer/demultiplexer 100 along a flow of a signal in a direction from the SONET/SDH network to the client device.

First, the SONET/SDH processor unit 160 terminates an SONET/SDH frame received from the network device. The VC phase adjustment unit 133 matches phases of paths in the SONET/SDH frame. The VC demapping unit 134 separates the SONET/SDH frame for each channel in accordance with setting of virtual concatenation.

The GFP frame synchronization unit 140 synchronizes GFP frames. The GFP frame checking unit 141 checks for abnormalities in the GFP frames.

The super block termination unit 142 performs CRC-16 error checking to verify that the super block has no abnormalities. The 64B/65B decoding unit 143 decodes the 65B block in the super block to 8B-byte data, and writes the 8B-byte data into the transmission 8B data FIFO 144. The rate adjustment unit 145 reads the 8B-byte data from the transmission 8B data FIFO 144 in accordance with the transmission speed of the client signal.

As the payload band of the SONET/SDH is larger than the transmission speed of the client signal, speed adjustment must be carried out. The 64B/65B decoding unit 143 does not write any paddings into the transmission 8B data FIFO 144, whereby the 8B-byte data and the control code written into the transmission 8B data FIFO 144 return to the transmission speed when the 8B-byte data and the control code were transmitted on the average. When the 8B data buffer length 147 of the transmission 8B data FIFO 144 becomes equal to or lower than a predetermined value, the rate adjustment unit 145 adjusts the number of bytes of the idle pattern to control a speed and fluctuation.

The 8B/10B coding unit 146 converts the 8B-byte data into a 10B character. The interface unit 101 transmits a signal of the 10B character to the client device.

According to the multiplexer/demultiplexer 100 of the embodiment, the 10B character data code and control code are converted into a 65B block to compress an amount of data, and a channel of the payload band matched with the amount of compressed data is set by the virtual concatenation of the SONET/SDH to reduce empty areas. Therefore, the data of the client protocol using the 8B/10B block coding can be efficiently received by the SONET/SDH network.

In addition, according to the multiplexer/demultiplexer 100 of the embodiment, a different interface unit 101 is selected for each client protocol having a different transmission speed, a signal from each interface unit 101 is changed to the system clock of the SONET/SDH in the receiving processor unit 110, a channel of the payload band matched with the amount of data from each interface unit 101 is multiplexed in the SONET/SDH frame set to be changeable in the virtual concatenation, and the data of the client protocol having a different transmission speed multiplexed in the SONET/SDH frame is returned to the clock of each protocol in the transmitting processor unit 130. Therefore, a variety of protocol data having different transmission speeds can be multiplexed to be efficiently received by the SONET/SDH network.

The padding is inserted when the clock is changed in the reception 8B data FIFO 116, and the padding is removed when the clock is changed in the transmission 8B data FIFO 144. Thus, speed adjustment is carried out between the client protocol and the virtual-concatenated channel of the SONET/SDH to enable clock changing and speed adjusting by a small circuit.

According to the multiplexer/demultiplexer 100 of the embodiment, writing of an idle pattern into the transmission 8B data FIFO 144 is inhibited, and addition of the idle pattern to data read from the transmission 8B data FIFO 144 is controlled, whereby a speed difference between the reception line clock 203 in the multiplexer/demultiplexer 100 for transmitting a signal to the SONET/SDH network, and the transmission line clock 204 in the multiplexer/demultiplexer 100 for receiving a signal from the SONET/SDH network is absorbed. Thus, the 10B character can be completely restored between ends.

The multiplexer/demultiplexer 100 of the embodiment has been described by way of example where the 8B/10B decoding unit 115 is disposed in the receiving processor unit 110, and the 8B/10B coding unit 146 and the rate adjustment unit 145 are disposed in the transmitting processor unit 130. However, the present invention is not limited to this configuration. In the multiplexer/demultiplexer of the invention, the 8B/10B decoding unit 115, the 8B/10B coding unit 146 and the rate adjustment unit 145 may be disposed in the interface unit 101.

According to the present invention, the client signal of a 10B-character form is converted into that of a GFP frame form to compress the amount of data, and the empty area is reduced by virtual concatenation, in which the channel is set in the payload band matched with the compressed amount of data. Thus, the client signal using the 8B/10B block coding can be efficiently received by the SONET/SDH network.

In the multiplexer/demultiplexer at the transmitting side to the SONET/SDH network, the client signals having different transmission speeds are changed to the system clock of the SONET/SDH side in the respective 1st FIFOs, and the channels of the payload band matched with the amount of data from the respective 1st FIFOs are multiplexed in the SONET/SDH frame set in the virtual concatenation. In the multiplexer/demultiplexer at the receiving side from the SONET/SDH network, client signals having different transmission speeds multiplexed in the SONET/SDH frame are changed to clocks of the respective client sides in the 2nd FIFOs corresponding to the respective client signals. Accordingly, a variety of protocol data having different transmission speeds can be multiplexed to be efficiently received by the SONET/SDH network. In addition, only at least one interface unit is prepared in accordance with each client signal, whereby at least one client signal of a different transmission speed is processed in common to be efficiently received by the SONET/SDH network.

The padding is inserted when the client signal is clock-changed in the 1st FIFO, and the padding is removed when the signal is clock-changed in the 2nd FIFO. Accordingly, speed adjustment is carried out between the client side and the SONET/SDH side to enable clock changing and speed adjusting by a small circuit.

Furthermore, writing of an idle pattern into the 2nd FIFO is inhibited, and addition of the idle pattern to data read from the 2nd FIFO is controlled, whereby a speed difference between the clock at the client side in the multiplexer/demultiplexer for transmitting a signal to the SONET/SDH network and a clock at the client side in the multiplexer/demultiplexer for receiving a signal from the SONET/SDH network is absorbed. Thus, the 10B character can be completely restored between ends.

While this invention has been described in connection with a certain preferred embodiment, it is to be understood that the subject matter encompassed by way of this invention is not to be limited to the specific embodiment. On the contrary, it is intended for the subject matter of the invention to include all alternatives, modifications and equivalents as can be included with the spirit and scope of the following claims.

What is claimed is:

1. A multiple signal transmission method, comprising the steps of:

transmitting a signal, in which plural client signals of differing speeds are multiplexed in a SONET/SDH frame, by using plural 8B/10B block coding; and receiving the multiple signal, wherein, the transmitting step includes the steps of concurrently converting the plural client signals, each client signal of a 10B-character form into a GFP frame form by a transparent GFP, the speed of the 10B-character form of each client being different from each other, mapping the client signal converted into the GFP frame form on a predetermined channel of virtual concatenation, and transmitting the SONET/SDH frame, in which the channel is multiplexed, the receiving step includes the steps of receiving the SONET/SDH frame, separating the channel multiplexed on the SONET/SDH frame, detecting the plural client signals of the GFP frame form from the channel, and concurrently converting the plural client signals of the GFP frame form into a 10B-character form by a transparent GFP, the step of converting each client signal of the 10B-character form into the GFP frame form includes the steps of:

converting each client signal of a different transmission speed and the 10B-character form into an 8B-byte form to write the signal into a 1st FIFO corresponding to each client signal;

synchronizing the client signal converted into the 8B-byte form and written into the 1st FIFO with a clock of a SONET/SDH side to read out the signal; and converting the client signal read out from the 1st FIFO into a GFP frame form, and the step of converting the client signal of the GFP frame form into a 10B-character form includes the steps of:

converting the client signal of the GFP frame form into an 8B-byte form to be written into a 2nd FIFO corresponding to each client signal;

synchronizing the client signal of the 8B-byte form written into the 2nd FIFO with a clock of each client side to read the signal; and converting the client signal of the 8B-byte form read from the 2nd FIFO through 8B/10B coding into a 10B-character form.

2. A multiple signal transmission method according to claim 1, wherein, when the client signal of the 8B-byte form written into the 1st FIFO is synchronized with the clock of the SONET/SDH side to be read out, if the 1st FIFO is empty, the client signal including a padding byte of the SONET/SDH is converted into a GFP frame form and, when the client signal of the 8B-byte form is written into the 2nd FIFO, the padding byte is discarded to write only a code other than the padding byte into the 2nd FIFO.

3. The multiple signal transmission method according to claim 1, wherein, when the client signal of the 8B-byte form is written into the 2nd FIFO, if the number of codes of the 8B-byte form in the 2nd FIFO is equal to/higher than a first threshold, an idle pattern of the client signal is discarded without being written into the 2nd FIFO and, when the client signal of the 8B-byte form is read out from the 2nd FIFO, if the number of codes of the 8B-byte form in the 2nd FIFO is equal to/lower than a second threshold, reading is stopped to insert the idle pattern at a time when the idle pattern comes to a head of the 2nd FIFO.

4. A multiplexer/demultiplexer for multiplex-transmitting plural client signals of differing speeds in a SONET/SDH frame by using 8B/10B block coding, comprising:

plural client channel receiving processor units, each unit for converting reception of client signal of a 10B-character form, and of differing speeds, into a GEP frame form by a transparent GFP;

a mapping unit for mapping the client signals converted into the GFP frame form on a predetermined channel of virtual concatenation;

a SONET/SDH processor unit for transmitting the SONET/SDH frame, in which the reception client signal of the GFP frame form is mapped, to a SONET/SDH network, and for receiving a SONET/SDH frame, in which at least one transmission client signal of a GFP frame form is mapped, from the SONET/SDH network;

a demapping unit for separating each channel of virtual concatenation multiplexed in the SONET/SDH frame received by the SONET/SDH processor unit; and plural client channel transmitting processor units, each unit for detecting each client signal of a GFP frame form from the channel separated from the demapping unit, and for converting the detected client signal of the GFP frame form into a 10B-character form by a transparent GFP, wherein each client channel receiving processor unit includes:

an 8B/10B decoding unit for converting at least one reception client signal of a different transmission speed and a 10B-character form into an 8B-byte form;

at least one 1st FIFO corresponding to the reception client signal, in which the reception client signal converted into the 8B-byte form by the 8B/10B decoding unit; and a GFP coding/encapsulation unit for synchronizing the reception client signal converted into the 8B-byte form with a clock of the SONET/SDH side to read out the signal from the 1st FIFO, and for converting the read-out client signal into a GFP frame form, the plural client channel receiving processors acting concurrently, and wherein each client channel transmitting processor unit includes:

a GFP termination/decoding unit for detecting each transmission client signal of a GFP frame form from the channel separated by the demapping unit to convert the transmission client signal of the GFP frame form into an 8B-byte form;

at least one 2nd FIFO corresponding to the transmission client signal, in which the transmission client signal converted into the 8B-byte form by the GFP termination/decoding unit;

a rate adjustment unit for synchronizing the client signal of the 8B-byte form with a clock of each client side to read out the signal from the 2nd FIFO; and an 8B/10B coding unit for converting the client signal of the 8B-byte form read out from the 2nd FIFO into a 10B-character form through 8B/10B coding, the plural client channel transmitting processor units acting concurrently.

5. The multiplexer/demultiplexer according to claim 4, wherein, when the reception client signal of the 8B-byte form written into the 1st FIFO is synchronized with the clock of the SONET/SDH side to be read out, if the 1st FIFO is empty, the GFP coding/encapsulation unit converts the client signal including a padding byte of the SONET/SDH into a GFP frame form, and the GFP termination/decoding unit discards the padding byte to write only a code other than the padding byte into the 2nd FIFO when the transmission client signal of the 8B-byte form is written into the 2nd FIFO.

6. The multiplexer/demultiplexer according to claim 4, wherein, when the transmission client signal of the 8B-byte form is written into the 2nd FIFO, if the number of codes of the 8B-byte form in the 2nd FIFO is equal to/higher than a first threshold, the GFP termination/decoding unit discards an idle pattern of the transmission client signal without writing the idle pattern into the 2nd FIFO, and when the client signal of the 8B-byte form is read out from the 2nd FIFO, if the number of codes of the 8B-byte form in the 2nd FIFO is equal to/lower than a second threshold, the rate adjustment unit stops reading to insert the idle pattern at a point of time when the idle pattern comes to a head of the 2nd FIFO.

* * * * *